(12) United States Patent
Graham

(10) Patent No.: US 6,958,564 B2
(45) Date of Patent: Oct. 25, 2005

(54) ARMATURE WITH UNITARY COIL AND COMMUTATOR

(75) Inventor: Gregory S. Graham, Ventura, CA (US)

(73) Assignee: ThinGap Corporation, Ventura, CA (US)

( * ) Notice: Subject to any disclaimer, the term of this patent is extended or adjusted under 35 U.S.C. 154(b) by 73 days.

(21) Appl. No.: 10/785,390

(22) Filed: Feb. 24, 2004

(65) Prior Publication Data

US 2005/0184616 A1   Aug. 25, 2005

(51) Int. Cl.⁷ .............................................. H01R 39/04
(52) U.S. Cl. ....................................... 310/236; 29/598
(58) Field of Search ..................... 310/236, 42; 29/598

(56) References Cited

U.S. PATENT DOCUMENTS

| | | |
|---|---|---|
| 1,631,186 A | 6/1927 | Apple |
| 1,738,166 A | 12/1929 | Apple |
| 1,789,129 A | 1/1931 | Apple |
| 1,917,482 A | 7/1933 | Apple |
| 2,780,742 A | 2/1957 | Jenner |
| 3,209,187 A | 9/1965 | Angele |
| 3,312,846 A | 4/1967 | Henry-Baudot |
| 3,441,761 A | 4/1969 | Painton |
| 3,488,837 A | 1/1970 | Massouda |
| 3,532,916 A | 10/1970 | Fisher |
| 3,551,715 A | 12/1970 | Silverton et al. |
| 3,562,569 A | 2/1971 | Koechlin |
| 3,609,431 A | 9/1971 | Lifschitz |
| 3,623,220 A * | 11/1971 | Chase et al. ................... 29/598 |
| 3,650,021 A | 3/1972 | Karol |
| 3,694,907 A | 10/1972 | Margrain et al. |
| 3,698,079 A | 10/1972 | Lifschitz |
| 3,726,004 A | 4/1973 | Holland et al. |
| 3,763,551 A | 10/1973 | Herron |
| 3,805,104 A | 4/1974 | Margrain et al. |
| 3,816,907 A | 6/1974 | Small |
| 3,944,857 A | 3/1976 | Faulhaber |
| 4,019,075 A | 4/1977 | Kagami |
| 4,123,679 A | 10/1978 | Miyasaka |
| 4,129,938 A | 12/1978 | Hagenbucher |
| 4,181,866 A * | 1/1980 | Morisawa .............. 310/154.04 |
| 4,187,453 A | 2/1980 | Rough |

(Continued)

FOREIGN PATENT DOCUMENTS

JP        55141963 A * 11/1980   .......... H02K 15/12

(Continued)

*Primary Examiner*—Joseph Waks
(74) *Attorney, Agent, or Firm*—McDermott, Will & Emery

(57) ABSTRACT

An armature for an electromotive device having a unitary coil and armature is disclosed. The armature may include a coil having inner and outer winding portions separated by an insulator, each of the winding portions comprising a plurality of sheet metal conductors, and a commutator having a plurality of sheet metal commutator segments each being integrally formed with one of the conductors. In one embodiment of the armature, the commutator may have a smaller outside diameter than the outside diameter of the coil. In the same or different embodiment of the armature, the commutator segments may have a width greater than the width of the conductors. The armature may be fabricated from a pair of conductive sheets by forming in each of the conductive sheets a plurality of conductive bands each having first and second conductor portions, shaping the conductive sheets into inner and outer cylinders, positioning the inner cylindrical conductive sheet inside the outer cylindrical conductive sheet, forming a coil from the first conductor portions of the inner and outer cylindrical conductive sheets, and forming a commutator from the second conductor portions of the inner and outer cylindrical conductive sheets.

14 Claims, 5 Drawing Sheets

U.S. PATENT DOCUMENTS

| | | |
|---|---|---|
| 4,268,810 A | 5/1981 | Iwasa et al. |
| 4,271,370 A | 6/1981 | DiMeo |
| 4,321,494 A | 3/1982 | MacNab |
| 4,337,568 A * | 7/1982 | Morisawa ................... 29/598 |
| 4,645,961 A | 2/1987 | Malsky |
| 4,808,873 A | 2/1989 | Rowe et al. |
| 5,130,596 A | 7/1992 | Umeki |
| 5,270,602 A | 12/1993 | Takehara |
| 5,714,828 A | 2/1998 | Ackermann et al. |
| 5,793,138 A | 8/1998 | Kliman et al. |
| 6,026,558 A | 2/2000 | Yoshida et al. |
| 6,111,329 A * | 8/2000 | Graham et al. ............... 310/42 |

FOREIGN PATENT DOCUMENTS

| | | | |
|---|---|---|---|
| JP | 05328678 | 12/1993 | |
| JP | 09271157 A * | 10/1997 | .......... H02K 15/04 |

\* cited by examiner

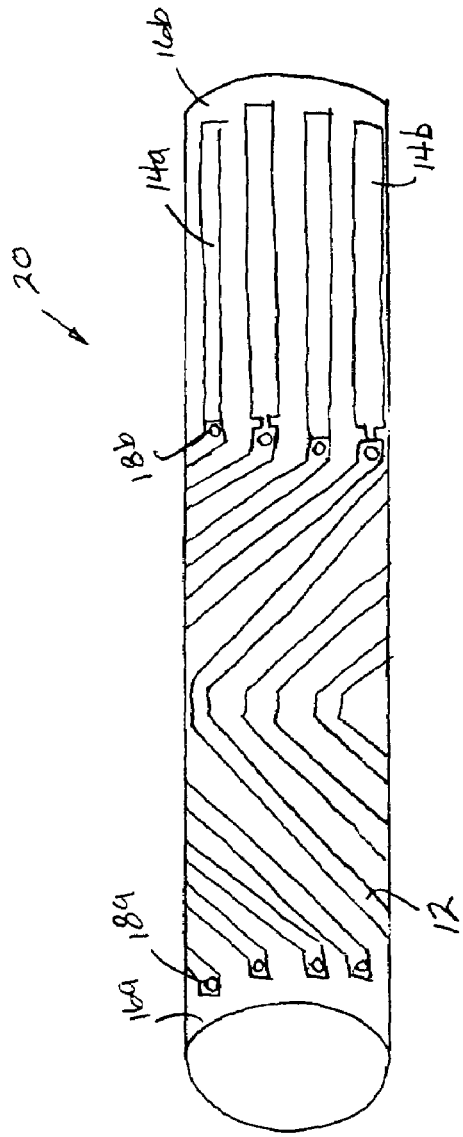
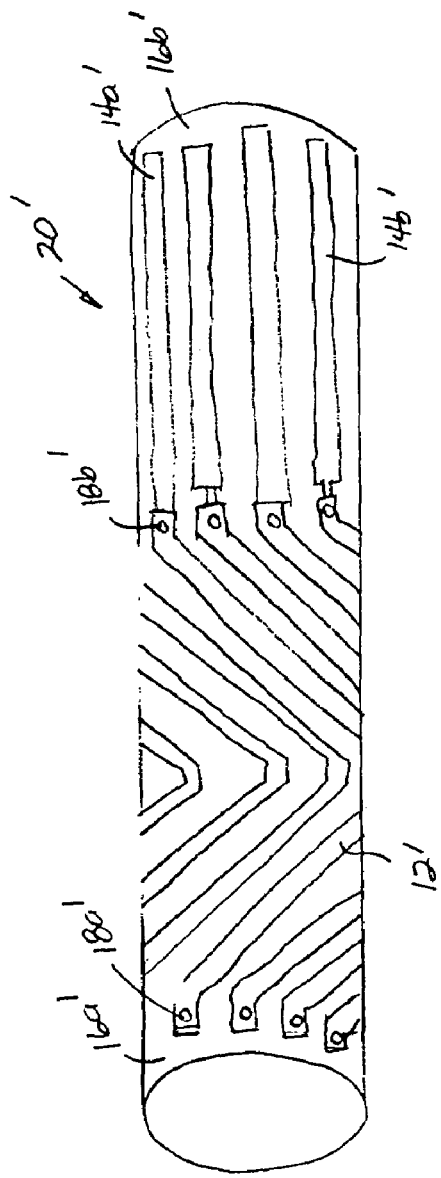
FIGURE 2A
FIGURE 2B

ARMATURE WITH UNITARY COIL AND COMMUTATOR

BACKGROUND

1. Field

The present disclosure relates to electromotive devices, and more particularly, to an armature for an electromotive device.

2. Background

Brush motors, and particularly brush motor armatures, have typically been fabricated using separate components for the commutator and the coil windings. These components need to be assembled separately and require a joining technique to electrically connect the coil windings to the commutator. Soldering, welding, crimping, or a variety of other manufacturing techniques are currently used to electrically connect the components.

Accordingly, there is a need in the art of brushless motors for a coil and commutator arrangement without the conventional electrical connections used in the past. If these electrical connections could be eliminated, it could reduce the size of the motor armature, improve the reliability of the armature (and thus the motor), and reduce the cost of manufacture.

SUMMARY

In one aspect of the invention, an armature for an electromotive device includes a coil having inner and outer winding portions separated by an insulator. Each of the winding portions includes a plurality of sheet metal conductors, and a commutator having a plurality of sheet metal commutator segments each being integrally formed with one of the conductors. The commutator has a smaller outside diameter than the outside diameter of the coil.

In another aspect of the present invention, an armature for an electromotive device includes a coil having inner and outer winding portions separated by an insulator. Each of the winding portions includes a plurality of sheet metal conductors, and a commutator having a plurality of sheet metal commutator segments, each of the commutator segments being integrally formed with one of the conductors and having a width greater than the width of the conductors.

In yet another aspect of the present invention, a method of fabricating an armature from a pair of conductive sheets includes forming in each of the conductive sheets a plurality of conductors each comprising first and second conductor portions, shaping the conductive sheets into inner and outer cylinders, positioning the inner cylindrical conductive sheet inside the outer cylindrical conductive sheet, forming a coil from the first conductor portions of the inner and outer cylindrical conductive sheets, and forming a commutator from the second conductor portions of the inner and outer cylindrical conductive sheets, the commutator having a smaller outside diameter than the outside diameter of the coil.

In a further aspect of the present invention, a method of fabricating an armature from a pair of conductive sheets includes forming in each of the conductive sheets a plurality of conductors each including first and second conductor portions, shaping the conductive sheets into inner and outer cylinders, positioning the inner cylindrical conductive sheet inside the outer cylindrical conductive sheet, forming a coil from the first conductor portions of the inner and outer cylindrical conductive sheets, and forming a commutator from the second conductor portions of the inner and outer cylindrical conductive sheets, the commutator including a plurality of commutator segments each having a width greater than the width of the first conductor portions.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings in which like reference numerals refer to similar elements wherein:

FIG. 2A is an elevation perspective view of the copper plate of FIG. 1A rolled into a hollow cylinder for use in an armature;

FIG. 2B is an elevation perspective view of the copper plate of FIG. 1B rolled into a hollow cylinder for use in an armature;

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The various embodiments described throughout this disclosure are directed to an ironless core armature for a DC motor with brushes. The armature may be a thin-walled, tubular, free-standing component having a coil and commutator with a unitary construction. The diameter of the commutator may be reduced to allow the brushes to operate at a lower surface speed, thus reducing drag and heat generation.

The unitary construction eliminates the need to join the coil and commutator reducing the axial space in the motor that would otherwise be needed to house the armature.

Figure 1A:
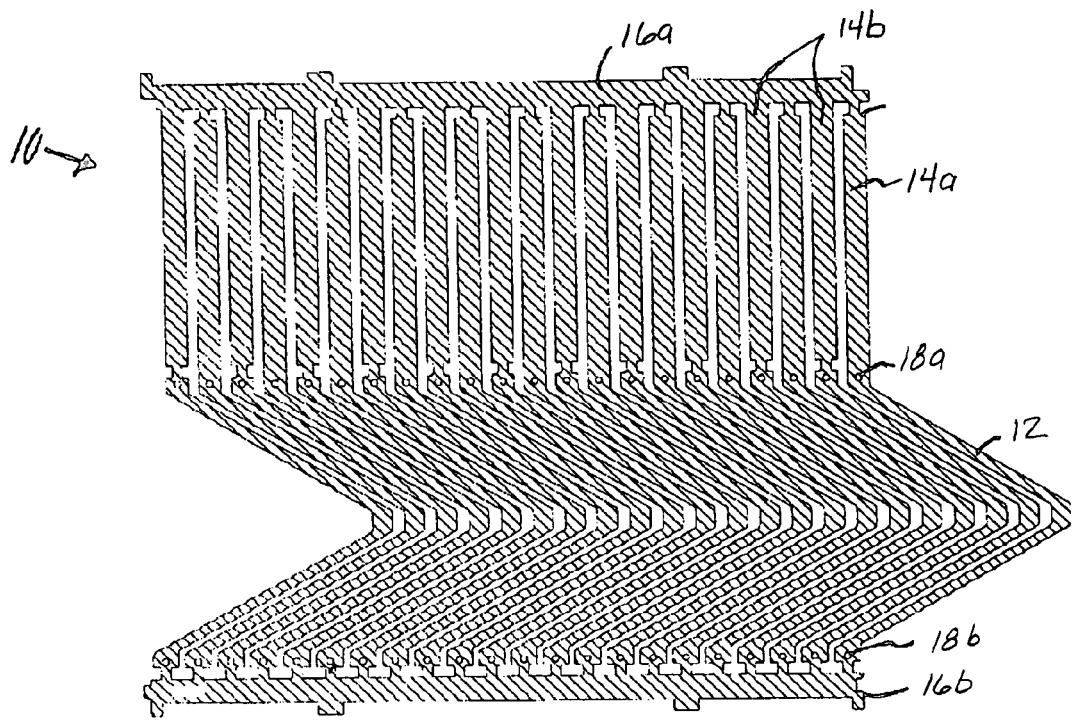
FIGS. 1A and 1B are plan views of a pair of copper plates, precision cut for use in an armature.
Figure 1B:
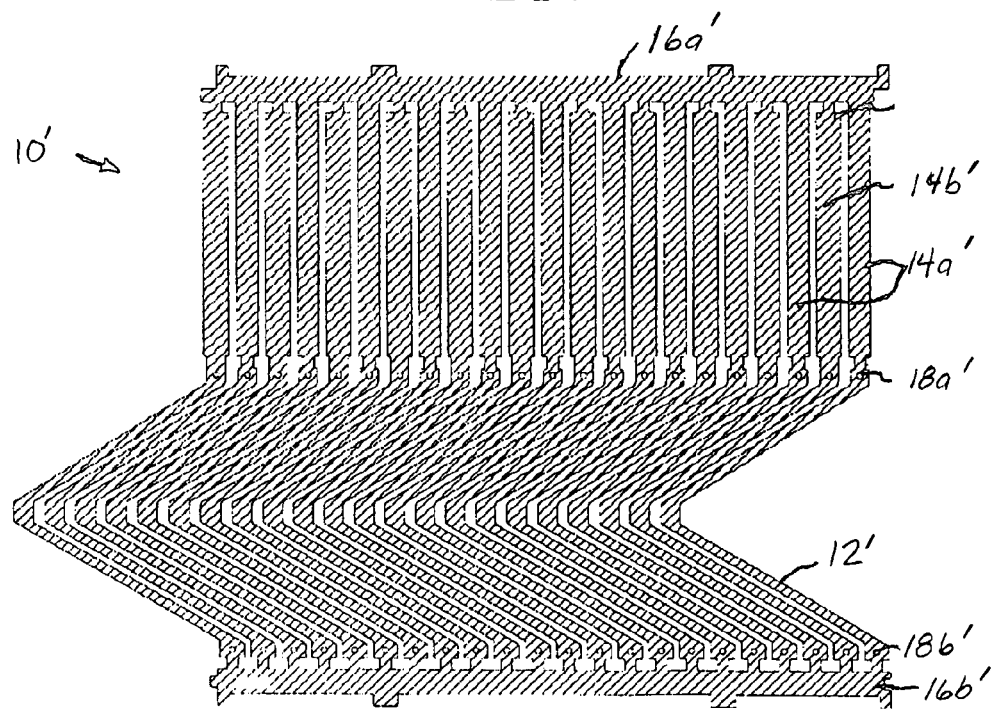

Referring to FIGS. 1A and 1B, the armature may be constructed from a thin pair of nearly mirror image, electrically conductive and precision-machined pieces of bare sheet metal plates 10 and 10'. The plates 10 and 10' may be tempered copper grade 110, or any other suitable material. The plates 10 and 10' may be 2"×3" (approximately 5 cm×7.5 cm) with a thickness of about 0.005" (0.12 mm). Other dimensions and materials may be used to manufacture the plates 10 and 10' depending on the particular application.

Each plate 10 and 10' may be processed to produce a series of generally parallel conductors. In at least one embodiment of the armature, the parallel conductors may be formed with spaces between them that are about 1–1.5 times the conductor thickness. Each conductor may have a coil portion 12 and 12' formed in a chevron pattern and a commutator portion 14a, 14b, 14"a and 14'b formed in a relatively straight pattern. The conductors in the commutator portion may include commutator segments 14a and 14a' with a support strip 14b and 14b' between each commutator segment 14a and 14a". The desired pattern may be achieved by precision cutting the plates by chemical machining. The desired pattern may be machined by alternate techniques such as water jet cutting, laser cutting, electron beam cutting, punching, progressive die or other conventional machining methods.

The plate 10 may include a carrier strip 16a and 16b on each edge, and the plate 10' may include a carrier strip 16a' and 16b' on each edge. The carrier strips may be used to support the conductors. The desired pattern may also include a series of relatively small pads, such as pads 18a and 18b on the plate 10 and pads 18a' and 18b' on the plate 10'. The diameter for each pad may be about 0.25 mm, or any other suitable size. The total number of pads is generally equal to twice the number of conductors. It will be appreciated that an armature of this type may be constructed from plates having less or more conductors and pads depending on the particular brushless motor application.

The plate 10 may be rolled into a thin-walled hollow cylindrical shape, such as cylinder 20 of FIG. 2A. The plate 10' may also be rolled into a thin-walled hollow cylindrical shape, such as cylinder 20' of FIG. 2B, but with its pattern of conductors specifically oriented to create a near mirror image of the pattern of the conductors of the plate 10. The diameter of the cylinder 20 may be about 0.510" and the diameter of the cylinder 20' may be about 0.520". The cylinder 20 may be formed with a slightly smaller diameter to allow subsequent axial alignment of the same into the cylinder 20' to form the armature. For this reason, the cylinder 20' will hereafter be referred to as the outer cylinder 20' and the cylinder 20 will be referred to as the inner cylinder 20. Other size cylinder diameters may be utilized.

Figure 3:
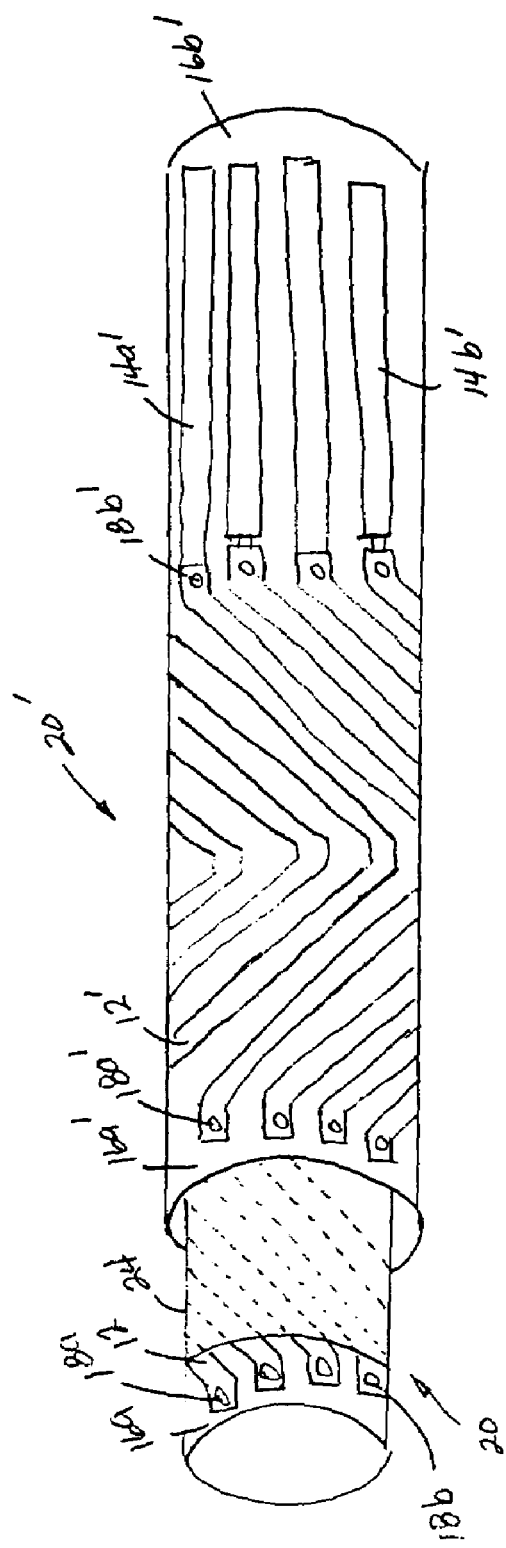
FIG. 3 is an elevation perspective view of the cylinder of FIG. 2 being inserted into the cylinder of FIG. 3 to form an armature.

Next, the inner cylinder 20 may be placed on a mandrel and four to five layers of fine industrial grade glass strands 24, shown in FIG. 3, commonly having a thickness of about 0.00015", may be tightly wrapped around the coil portions of the conductors while at the same time avoiding the pads of the inner cylinder 20. The tight wrapping of multiple layers of glass fiber strands over the coil portions of the conductors generally provides structural support for the tubular structure. The glass fiber layers may also provide a certain degree of physical separation and concomitant electrical insulation between the inner cylinder 20 and the outer cylinder 20'. The thickness of the glass fiber layers may be about 0.00075" and, is therefore, relatively small but may add significant strength. The wrapped inner cylinder 20 may then be inserted all the way into the outer cylinder 20' so as to ensure concentric and axial alignment of both cylinders and matching of respective pads on the inner cylinder 20 with the corresponding pads on the outer cylinder 20'. The next step may be to tightly wrap layers of industrial grade glass fiber strands over the coil portions of the conductors in the outer cylinder 20' in the same way as was done with the inner cylinder 20. This glass fiber layer may provide additional structural support. The thickness of the outer cylinder glass fiber layers may be about 0.001".

The coil portions of the conductors in the inner and outer cylinders may be soldered, or otherwise electrically attached, at their respective pads to form a continuous, inductive helical coil. The pads may provide solder flow paths using, for example, a lead-silver-tin solder material which can withstand operational temperatures as high as 450 degrees Fahrenheit ("F"). The pads may be welded instead of soldered to create an interconnect with copper as the base weld material to allow even higher armature temperatures during operation. Alternative methods of interconnecting the pads may be used, such as crimping, spot welding or laser welding. If welding is used, the armature operational temperature may rise to about 600 degrees F., which is the utilization temperature of the encapsulation material to be applied later. The matched pads 18a, 18a' and 18b, 18b", respectively, are not required if solder is not the selected bonding material.

Figure 4:
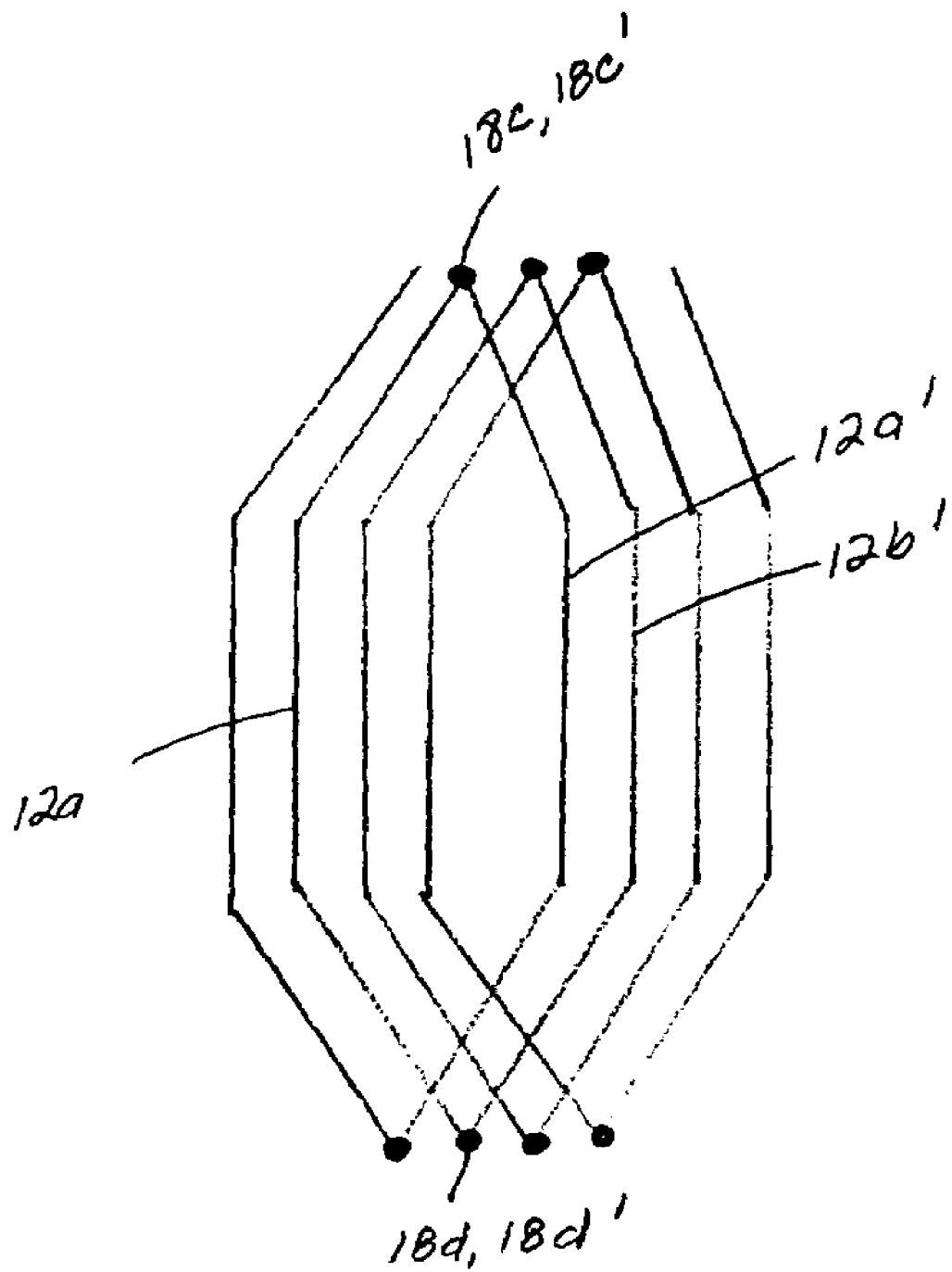
FIG. 4 is a schematic diagram illustrating the interconnection of conductive loops to form a continuous cylindrical conductive coil of an armature.

The soldered joints electrically interconnect all the coil portions of the conductors of the inner cylinder 20 with the respective coil portions of the outer cylinder 20' so as to form a continuous, inductive helical structure as shown in FIG. 4. FIG. 4 shows an example of the coil on the armature, illustrating in detail how a portion of the helical structure of the coil may be accomplished. For example, the conductor coil portion 12a of the inner cylinder 20 may be electrically connected to the conductor coil portion 12a' of the outer cylinder 20' by soldering together, or otherwise joining, pads 18c and 18c". The other end of the conductor coil portion 12a may be electrically connected to the conductor coil portion 12b' of the outer cylinder 20' by soldering together, or otherwise joining, pads 18d and 18d". The rest of the conductor coil portion of the inner cylinder 20 may be similarly interconnected with respective conductor coil portions of the outer cylinder 20' with the total number of interconnections at each end being the same. Essentially, the conductor coil portions 12 of the inner cylinder 20 provide one half of the electric circuit and the conductor coil portions 12' of the outer cylinder 20' provide the other half of the circuit. Joining the two halves completes the electric circuit.

Once the coil is formed, the carrier strips 16a and 16b on the inner cylinder 20 and the carrier strips 16a' and 16b' on the outer cylinder 20' may be removed. The removal of the carrier strips may include the removal of the support strips in both cylinders of the armature. The remaining commutator segments of the inner conductor 20 may then be electrically connected to the remaining commutator segments of the outer cylinder 20' by soldering, crimping, or other means.

Figure 5:
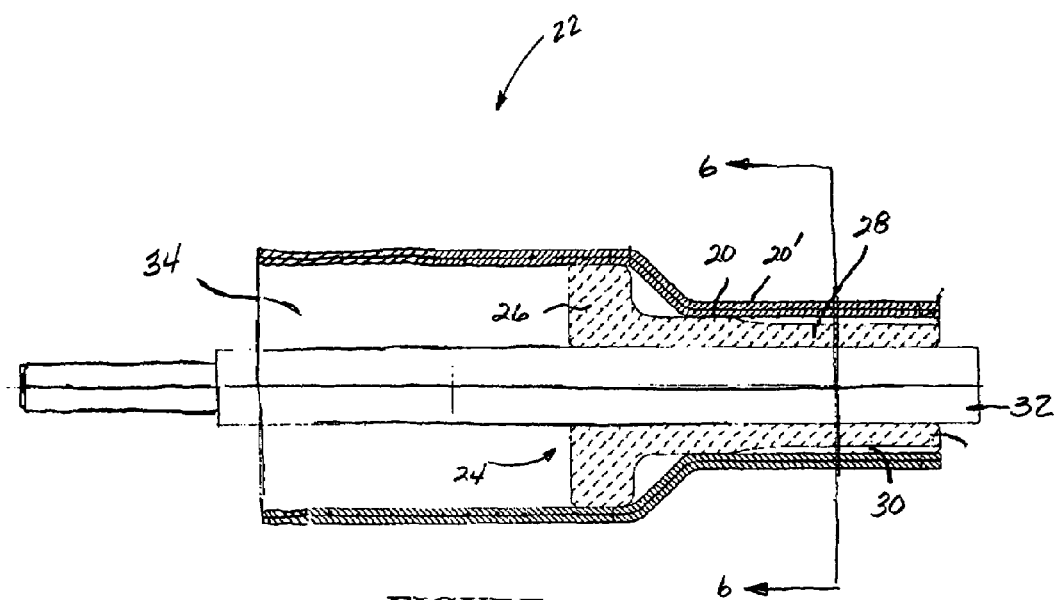
FIG. 5 is a longitudinal cross-sectional view of an armature.
Figure 6:
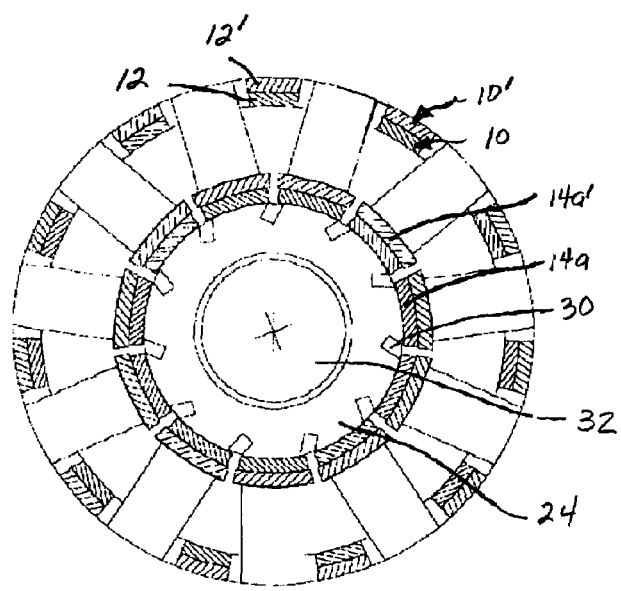
FIG. 6 is a transverse cross-sectional view of the armature of FIG. 5, taken along section line 6—6.

Referring to FIGS. 5 and 6, the armature 22 may also include an aluminum flywheel 24 formed with a disc-shaped portion 26 that may be bonded to the inner cylinder by electrically insulating adhesive means. A cylindrical portion 28 extending in the axial direction from the disc-shaped portion 26 may be designed with a reduced diameter. After the flywheel 24 is inserted into the armature 22, the commutator segments may be deformed inwardly around the cylindrical portion 28 and bonded thereto by electrically insulating adhesive means. The outer surface of the cylindrical portion 28 may be slotted 30 to improve adhesion of the flywheel to the inner surface of the commutator. The flywheel 24 may also include an axially disposed output drive shaft 32 rigidity affixed to the flywheel 24.

Prior to the installation of the output drive shaft, the armature 22 may be impregnated with encapsulating compound to provide additional structural stability, to permanently secure all components, and to provide complete electrical insulation of the device. Specifically, the armature 22 may be impregnated with encapsulating polyimide, for example, a polyimide comprised of 25% solid/solute (polyimide) and 75% solvent (NMP). The armature 22 may be centrifuged, injected, dipped, impregnated or otherwise encapsulated to replace air voids with the polyimide solution. Centrifugal force pushes the air out of the structure and pushes the polyimide deeper into the crevices and cracks of the telescoped tubular structure allowing permanent bonding and insulation of the components.

The polyimide impregnated armature 22 may be heat-cured, for example, at a temperature of about 500 degree F. to remove solvents and to yield a hardened, cured polyimide encapsulated armature. A limitation to the curing temperature is the solder flow temperature generally about 550 degree F.; however, using non-solder welding techniques may allow polyimide curing at 695 degrees F. and armature operating temperatures of 600 degrees F. Other potting materials may be used such as ceramic, glass, silicates, silicones, etc. After the armature 22 has been heat-cured, it may be allowed to cool to room temperature.

The commutator segments on the armature 22 may be used to present a smooth cylindrical rotating surface for the brushes to distribute current to the coil. When the support strips are removed from the armature 22, the number of remaining commutator segments is half the number of coil conductors. This construction enables the commutator to form a cylindrical structure having a reduced diameter relative to the coil. A cylindrical cavity 34 bounded by the coil may be adapted to receive a cylindrical magnetic stator assembly (not shown) for various motor or generator applications.

While particular embodiments of the present invention have been illustrated and described, it would be apparent to those skilled in the art that various other changes and modifications can be made without departing from the spirit and scope of the invention. For example, the brushless motor in alternative embodiments may be configured to provide electrical generation when the shaft is rotated by mechanical means. Thus, the present invention is not intended to be limited to the embodiments shown herein but is to be accorded the widest scope consistent with the principles and novel features disclosed herein.

What is claimed is:

1. An armature for an electromotive device, comprising:
a coil having inner and outer winding portions separated by an insulator, each of the winding portions comprising a plurality of sheet metal conductors; and
a commutator having a plurality of sheet metal commutator segments each being integrally formed with one of the conductors, the commutator having a smaller outside diameter than the outside diameter of the coil.

2. The armature of claim 1 wherein the commutator segments comprise at least first and second layers, the first layer of commutator segments and the conductors of the outer winding portion being formed from a first piece of sheet metal, and the second layer of commutator segments and the conductors of the inner winding portion being formed from a second piece of sheet metal.

3. The armature of claim 1 wherein each of the commutator segments comprises a width greater than the width of its corresponding conductor.

4. The armature of claim 1 wherein the number of the commutator segments is less than the number of conductors of the outer winding portion.

5. The armature of claim 1 further comprising a flywheel having a first portion supporting the coil and a second portion supporting the commutator, the first portion having a larger outside diameter than the outside diameter of the second portion.

6. The armature of claim 5 further comprising a shaft extending axially through the flywheel.

7. The armature of claim 1 wherein the insulator comprises a first non-conductive filament wrapped around the inner winding portion, the armature further comprising a second non-conductive filament wrapped around the outer winding portion and polyimide encapsulating the commutator and coil, the first and second filaments being impregnated by polyimide.

8. An armature for an electromotive device, comprising:
a coil having inner and outer winding portions separated by an insulator, each of the winding portions comprising a plurality of sheet metal conductors; and
a commutator having a plurality of sheet metal commutator segments, each of the commutator segments being integrally formed with one of the conductors and having a width greater than the width of its corresponding conductor.

9. The armature of claim 8 wherein the commutator segments comprises at least first and second layers, the first layer of commutator segments and the conductors of the outer winding portion being formed from a first piece of sheet metal, and the second layer of commutator segments and the conductors of the inner winding portion being formed from a second piece of sheet metal.

10. The armature of claim 8 wherein the commutator has a smaller outside diameter than the outside diameter of the coil.

11. The armature of claim 10 further comprising a flywheel having a first portion supporting the commutator and a second portion supporting the coil, the first portion having a smaller outside diameter than the outside diameter of the second portion.

12. The armature of claim 11 further comprising a shaft extending axially through the flywheel.

13. The armature of claim 8 wherein the number of the commutator segments is less than the number of conductors of the outer winding portion.

14. The armature of claim 8 wherein the insulator comprises a first non-conductive filament wrapped around the inner winding portion, the armature further comprising a second non-conductive filament wrapped around the outer winding portion and polyimide encapsulating the commutator and coil, the first and second filaments being impregnated by polyimide.

* * * * *